3,207,614
CURE INDICATOR
Gerard P. Canevari, Cranford, N.J., assignor to Esso Research and Engineering Company, a corporation of Delaware
No Drawing. Filed Dec. 28, 1961, Ser. No. 162,984
1 Claim. (Cl. 106—287)

This invention relates to heat cured compositions containing temperature sensitive pigments wherein the pigment changes its appearance as an indication of the state of cure of the composition.

Broadly an object of this invention is to provide pigmented heat curable compositions which will reflect the state of cure of the composition by an irreversible change in the appearance of the pigment upon the application of heat.

It is well known to apply a coating to a base and change the appearance of the coating by reason of chemical changes, such as oxidation or decomposition. It is also known to coat a base with a mixture of an organic pigment and a transparent resin and to observe the visual changes occuring above the melting point of the pigment. These methods suffer from a lack of precision because the chemical changes are slow and the presence of the resin prevents accurate temperature determination. In addition, all of these methods are dependent on color changes at a predetermined temperature. Such methods cannot be used to determine, for example, the state of cure of a heat curable composition since cure is dependent not only on temperature but also on time and hence may occur over a wide range of temperatures.

It has now been found that these and other disadvantages of the prior art may be overcome by the addition to heat curable compositions of copper phthalocyanine, otherwise known as Monastral Blue, which is sensitive to the state of cure of the composition thus affording a positive indication that proper curing of the composition has occurred. This compound is a deep blue pigment made by reaction of copper with four molecules of phthalonitrile as described by Fieser and Fieser, Organic Chemistry, 3rd edition, page 933, which is incorporated herein by reference.

The pigment may be added to any type of heat curable composition such as natural drying oil varnishes, heat curable synthetic resin compositions, etc. A film of the resin is applied to a suitable base and heated to a temperature between 300 and 650° F. until the color changes from blue to green. Above this range decomposition of the resin occurs. Below this range curing proceeds very slowly, if at all. A particularly suitable type of composition to which the present invention is applicable is the polymeric oil prepared from conjugated diolefins, which have 4 to 6 carbon atoms per molecule, e.g., butadiene, hexadiene, isoprene, dimethyl butadiene, piperylene, and methyl pentadiene. Such diolefins may be copolymerized with minor amounts (e.g. up to 25 parts) of ethylenically unsaturated monomers, e.g., styrene, acrylonitrile, methyl vinyl ketone, or with styrenes having alkyl groups substituted on the ring, e.g., paramethyl styrene and dimethyl styrene. A preferred diolefin polymeric oil is one prepared by reacting 75 to 100 parts of butadiene and 25 to 0 parts of styrene in the presence of metallic sodium catalyst. Polymerization is carried out in a reaction diluent at temperatures from about 25° C. to 105° C. with about 0.5 to 5 parts of finely divided alkali metal, such as sodium per 100 parts of monomers used. The diluent used in the polymerization must boil between about −15° C. and 200° C., in amounts ranging from 100 to 500 parts per 100 parts of monomers; preferred diluents are aliphatic hydrocarbons such as solvent naphtha or straight-run mineral spirits such as Varsol. In order to obtain a water white product, a codiluent, about 10 to 45 parts per 100 parts of monomers, may also be used, consisting of a $C_4$ to $C_8$ aliphatic ether or cyclic ethers and polyethers other than those having a —O—C—O— grouping; particularly useful ethers are dioxane 1,4 and diethyl ether. Finally, it is beneficial to use about 5 to 35 weight percent, based on sodium, of an alcohol such as methanol, isopropanol, or an amyl alcohol in order to overcome the initial induction period. The resulting product may vary in viscosity from 0.15 to 20 poises when tested as a 50% solution in Varsol. The preparation of this oil in the presence of an alkali metal is described in U.S. Patent No. 2,762,851. Similar types of oils may be prepared by the use of other catalysts, e.g., peroxides as described in U.S. Patent No. 2,586,594. Both of these patents are incorporated herein by reference.

Varnishes may be prepared from these oils by dissolving them in suitable hydrocarbon solvents in a manner well known in the art.

If desired, these polymeric drying oils may be modified by blowing them with air or oxygen, preferably in the presence of a solvent, as aromatic solvents or solvent mixtures having a Kauri Butanol value of at least 50. The choice of solvents will depend upon the oxygen content desired in the finished oil, the formation of the coating compositions, and the most economical one to achieve the desired results. Examples of suitable solvents include aromatic hydrocarbons, with or without aliphatic hydrocarbons, boiling up to about 250° C., preferably between 100° and 200° C. The oxidation can be carried out by blowing air or oxygen into the polymer with or without a catalyst. Suitable catalysts are organic salts of metals such as cobalt, lead, iron, and manganese. The naphthenates, octonates, and oleates are especially suitable. These catalysts are used in amounts ranging from 0.001% to 1.0%. The nature of the oxidized diolefin polymer largely depends upon the type of original polymerization and the extent of oxidation which is dependent upon various factors as time, temperature, catalyst, and solvent. Preferred compounds are the oxidized copolymers of 75 to 85% butadiene and 25 to 15% styrene with about 10 to 20% oxygen in the structure.

The following specific examples are given to illustrate the invention. Unless otherwise indicated all proportions are given in parts by weight.

*Example I*

About 20% of a suspension of copper phthalocyanine pigment suspended in 9 parts of silicone oil was added to an air blown copolymer of 80 parts of butadiene and 20 parts of styrene dissolved in Solvesso 100 (an aromatic hydrocarbon solvent boiling 150–175° C.), the solution having a viscosity of about 3.0 poise and containing about 16% oxygen. The resulting color of the mixture was blue. The pigment-polymer mixture was coated on a base and baked at 350° F. for 12 hours. The cured mixture had changed to an olive drab green. When the experiment was repeated and heated for less than 12 hours no color change was apparent.

A second sample of the pigment-polymer mixture was coated on a base and cured by subjecting it to a flame of burning hydrocarbon gases at 600° F. for one minute. Again a color change from blue to green occurred.

*Example II*

A steel panel was coated with the air blown polymer of Example I containing about 20% of a suspension of copper phthalocyanine pigment in silicone oil and a flame was applied to one end of the panel. A temperature gradient was thus established over the length of the panel. The excessive temperature at the point of flame impingement caused the coating to deteriorate and char. Where the panel temperature was adequate, the coating was hard and cured and had changed color. Where the panel temperature was too low, the coating was uncured and soft (<4H pencil hardness) and did not turn color.

The above data clearly show that the color change of the pigment is due not to temperature but to state of cure. When the pigment was heated at 350° F. for less than the 12 hours necessary for a complete cure no color change was observed.

The nature of the present invention having been thus fully set forth, what is claimed as new and useful and desired to be secured by Letters Patent is:

A method for determining whether a curable composition consisting of an air blown liquid copolymer of butadiene and styrene containing from 10 to 20 wt. percent oxygen has reached a state of cure which comprises adding copper phthalocyanine to said curable composition, and heating said composition between 300 and 650° F. and discontinuing said heating when said composition changes from blue to green.

References Cited by the Examiner

UNITED STATES PATENTS

| | | | |
|---|---|---|---|
| 2,276,175 | 3/42 | Fleysher et al. | 260—314.5 |
| 2,291,452 | 7/42 | Dahlen et al. | 260—314.5 |
| 2,652,342 | 9/53 | Gleason | 106—285 |
| 2,856,300 | 10/58 | McKay | 106—285 |
| 2,856,309 | 10/58 | Gleason et al. | 106—285 |
| 2,999,862 | 9/61 | Geiger | 106—253 |

MORRIS LIEBMAN, *Primary Examiner.*

ALEXANDER H. BRODMERKEL, *Examiner.*